United States Patent
Wang

[19]

[11] Patent Number: 6,160,571
[45] Date of Patent: Dec. 12, 2000

[54] COMPACT CABLE TUNER/TRANSCEIVER

[75] Inventor: James L. Wang, San Jose, Calif.

[73] Assignee: ISG Broadband, Inc., Milpitas, Calif.

[21] Appl. No.: 09/302,897

[22] Filed: Apr. 30, 1999

Related U.S. Application Data

[60] Provisional application No. 60/084,075, May 4, 1998.

[51] Int. Cl.$^7$ .................................................. H04N 7/10
[52] U.S. Cl. .............................. 348/10; 348/12; 348/725; 455/295; 455/310; 455/301
[58] Field of Search .................................... 348/6, 7, 10–13, 348/725, 731; 455/3.1, 5.1, 6.1, 6.2, 295, 310, 311, 312, 300, 301, 78, 79, 76

[56] References Cited

U.S. PATENT DOCUMENTS

| | | | |
|---|---|---|---|
| 4,569,084 | 2/1986 | Takahama | 455/131 |
| 5,355,162 | 10/1994 | Yazolino et al. | 348/11 |
| 5,437,052 | 7/1995 | Hemmie et al. | 455/5.1 |
| 5,890,051 | 3/1999 | Schlang et al. | 455/76 |
| 5,956,098 | 9/1999 | Mizukami et al. | 348/735 |
| 5,966,188 | 10/1999 | Patel et al. | 348/726 |

*Primary Examiner*—Andrew I. Faile
*Assistant Examiner*—Ngoc K. Vu
*Attorney, Agent, or Firm*—Gerald B. Rosenberg; New Tech Law

[57] ABSTRACT

A CATV transceiver is provided within an RF shield enclosure. The transceiver circuit includes a diplexer, having fixed value inductors, that is coupleable to a CATV cable plant to receive an RF input signal and to transmit an RF output signal. The RF receiver is coupled to the diplexer and includes a frequency up-converter, a first frequency down-converter and a second frequency down-converter. The up and first down-converters include voltage controlled oscillators that are responsive to a control signal generated from a single oscillator crystal. The second frequency down-converter operates to provide an output signal representative of the RF input signal within a predetermined output frequency pass-band. The RF transmitter is also coupled to the diplexer and provides for the transmission of the RF output signal in response to an input signal. A transceiver controller is coupled through the housing to the up and first down-converters to establish respective modulation frequencies such that the LO-related frequency cross-products due to the concurrent use of the respective modulation frequencies occur outside of the predetermined frequency pass-band.

20 Claims, 4 Drawing Sheets

COMPACT CABLE TUNER/TRANSCEIVER

CROSS-REFERENCE TO RELATED APPLICATION

This Application is related to Provisional Application Ser. No. 60/084,075, entitled "Compact Cable Transceiver," filed May 4, 1998.

BACKGROUND OF THE INVENTION

1. Field of the Invention

The present invention is generally related to cable television (CATV) radio frequency tuners and, in particular, to a low-cost, high-integration, high-performance, compact CATV compatible RF tuner/transceiver.

2. Description of the Related Art

The design of radio frequency transmitters and receivers, or transceivers, has been and remains problematic due to the related problems of RF radiation sensitivity of the circuit and circuit components and the propensity for active components to radiate in-band and in harmonically related RF bands. Consequently, the shielding and layout of RF circuits, such as those used in the CATV frequency band of 5 to 860 MHz, remains a primary design consideration for RF circuits.

The use of RF circuits, particularly those targeted to operate within the CATV range of frequencies (generally 5 to 860 MegaHertz), has become quite common as the CATV cable plant in particular has been implemented over wider geographic areas. The cable head-end systems, operated by local or regional Cable Operators as the source of cable content programming, are typically sophisticated, high-performance, and correspondingly expensive RF transmitter systems. The physical size, power consumption, and operating maintenance requirements of these head-end systems have been and generally remain secondary considerations in the design and construction of the head-end systems. This prioritization in the features and functions of head-end systems is a conventionally accepted consequence of the fact that a single head-end system is capable of serving large numbers of tail-end or client systems. In addition, with increasing ratios of tail to head-end systems, the power and performance requirements on the head-end system increase at much greater than linear rates, if only due to the larger geographic area involved and the larger amount of noise injection due to greater numbers of connections to tail-end systems.

Conversely, conventional receiver-only, or tuner, tail-end systems are largely driven by low-cost due to the commoditization of such systems. The size, power requirements, and RF shielding of the packaged tail-end systems are all easily within acceptable ranges without much if any exceptional design considerations. Particularly with regard to the RF shielding, other than compartmental shielding for the highest-frequency portion of the circuit, often little more than a simple ferritic coating on the insides of the system housing is used. Since the enclosed circuitry is conventionally a singular RF receiver/tuner, the sensitivity of the circuitry in general to RF radiation is much less than conventionally required in full RF transceiver applications, including in particular those employing digital RF transceivers.

Conventionally, nothing more than a receiver-only tail-end system was required or previously even usable. However, with the expansive growth of wide-area networks, such as the Internet, a need has been recognized to provide a tail-end system transmitter function. Specifically, the target of so-called cable-modem Internet Service Providers (ISPs) is to use the existing CATV cable plant as a high-performance, likely asymmetric, bidirectional data network. Current cable modem systems are able to broadcast network data to tail-end systems. Return network data, however, is presently transported through the existing analog telecommunications network. The requirement for a separate analog modem and the cost of making the return data connections are well recognized as undesirable and an impediment to the wide adoption of cable modem technologies.

Present efforts to package a transmitter in tail-end systems range from loosely packaging a separate transmitter within the overall tail-end system housing to providing a separate transmitter and receiver on a common printed circuit board separated by complex shielding conventionally recognized as necessary to preserve the independent function of the transmitter and receiver sections. In all cases, the design complexity, manufacturing tolerance design limitations, post-manufacture circuit tuning requirements, and resultant cost is generally viewed as inappropriate for commoditization of transceiver tail-end cable modem systems, particularly for mass-consumer oriented customer premises equipment (CPE).

Consequently, there is a clear need for a new tail-end system design that achieves full functional support for a CATV RF frequency transceiver that is suitable for commoditization.

SUMMARY OF THE INVENTION

Thus, a general purpose of the present invention is to realize a CATV RF frequency transceiver unit that is suitable for commoditization for cable modem applications.

This is achieved in the present invention by providing a CATV transceiver within a housing providing RF shielding for the transceiver circuit. The housing encloses the transceiver circuit, which includes a diplexer, having fixed value inductors, that is coupleable to a CATV cable plant to receive an RF input signal and to transmit an RF output signal. The RF receiver is coupled to the diplexer and includes a frequency up-converter, a first frequency down-converter and a second frequency down-converter, the converters each including a voltage controlled oscillator coupled to a signal mixer. Each of the voltage controlled oscillators are responsive to a control signal generated from a single oscillator crystal. The second frequency down-converter operates to provide an output signal representative of the RF input signal within a predetermined output frequency pass-band. The RF transmitter is also coupled to the diplexer and provides for the transmission of the RF output signal in response to an input signal.

A transceiver controller is coupled through the housing to the frequency up-converter and the first frequency down-converter to establish their respective IF frequencies. The controller operates to select respective modulation frequencies such that the LO-related frequency cross-products due to the concurrent use of the respective IF frequencies occur outside of the predetermined frequency pass-band.

Consequently, an advantage of the present invention is that a compact, low-cost, readily and reliably manufacturable CATV transceiver can be realized.

Another advantage of the present invention is that the a complete CATV type transceiver circuit can be packaged together within a small shielded enclosure, which supports commodity use of the circuit.

A further advantage of the present invention is that a fixed value diplexer filter circuit can be used. With fixed values, automated component placement of small surface mount devices results in lower assembly costs and tighter component placement leading to a smaller overall unit size.

Still another advantage of the present invention is that the transceiver circuit is designed for dynamic avoidance of LO-related in-band spurious noise, thereby simplifying the static design parameters of the circuit. Specifically, the allowed static design of the diplexer avoids the necessity of manually tuning the assembled circuit and the associated costs and tuning errors, as well as damages due to the additional handling and the time penalty for the additional post assembly production steps.

Yet another advantage of the present invention is that the operation of the up and first down-converters can be statically established to mutually provide compensation for offset errors that separately occur from the crystal based, and therefore thermal drift sensitive, operation of the converters. Operating the up and first down-converters from a common crystal reference, but with complementary polarity offset error coefficients minimizes if not eliminates the primary source of offset error in the transceiver circuit.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

Figure 1:
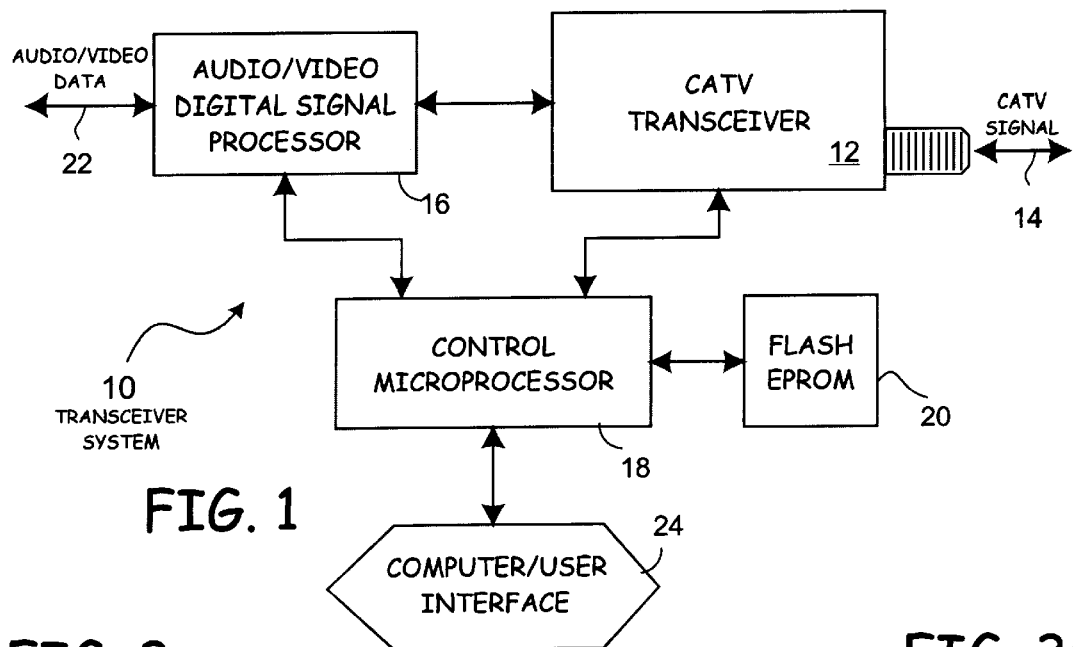
FIG. 1 is a general block diagram of a compact cable modem transceiver constructed in accordance with the present invention.

An RF transceiver system 10, as shown in FIG. 1, performs in accordance with a preferred embodiment of the present invention as a bidirectional CATV cable interface. The cable in-bound RF frequency signals, ranging between 54 and 860 MHz and corresponding to the conventional cable TV channel band are received by a CATV transceiver 12 from the CATV cable plant 14. Conversely, the transceiver 12 is capable of transmitting RF frequency signals onto the CATV cable plant 14. In accordance with the preferred use of the present invention as a cable modem, the transmitted signals are within a frequency band of 5 to 42 MHz.

The transceiver 12 is preferably a unitary component constructed from a light-weight plated-steel material forming a perimeter wall with protrusions supporting a printed circuit board centered along the width of the wall. Front and back covers, formed from the same material, snap onto the wall edges to provide an enclosing RF shield housing. The assembled size of the housing, excluding a coaxial connector and a pin connector, is approximately 3.5 by 2.0 by 0.5 inches.

The coaxial connector provides the physical interconnect to the CATV cable plant 14 while the pin connector provides signal connections to a digital signal processor (DSP) 16 and a control microprocessor 18. The signals interconnecting the DSP 16 and transceiver 12 include differential video frequency transmit and receive data lines. The signals coupled to the transceiver 12 from the microprocessor include control signal lines to effectively set the transmitter and receiver channel frequencies.

In a preferred embodiment of the present invention, the control microprocessor 18 is also coupled to the DSP 16 to establish the operating configuration of the DSP 16, which may be determined from data stored by a flash EPROM 20 or other source of non-volatile information. A configuration interface 24, operable by computer or manual switches, may be provided to allow initial configuration data to be established.

The DSP 16 is preferably provided with a multifunction interface 22. In a preferred embodiment of the present invention, a bidirectional computer data interface 22 is used by a host computer system (not shown) to provide data to the DSP 16 for encoding into a pseudo-video data stream that is modulated by the transceiver 12 prior to transmission to the cable plant 14. In a similar manner, computer data decoded from a demodulated pseudo-video data stream is passed through the interface 22 to the host computer system. Additionally, bidirectional analog audio and video data transfer may be supported through the interface 22.

Figure 2:
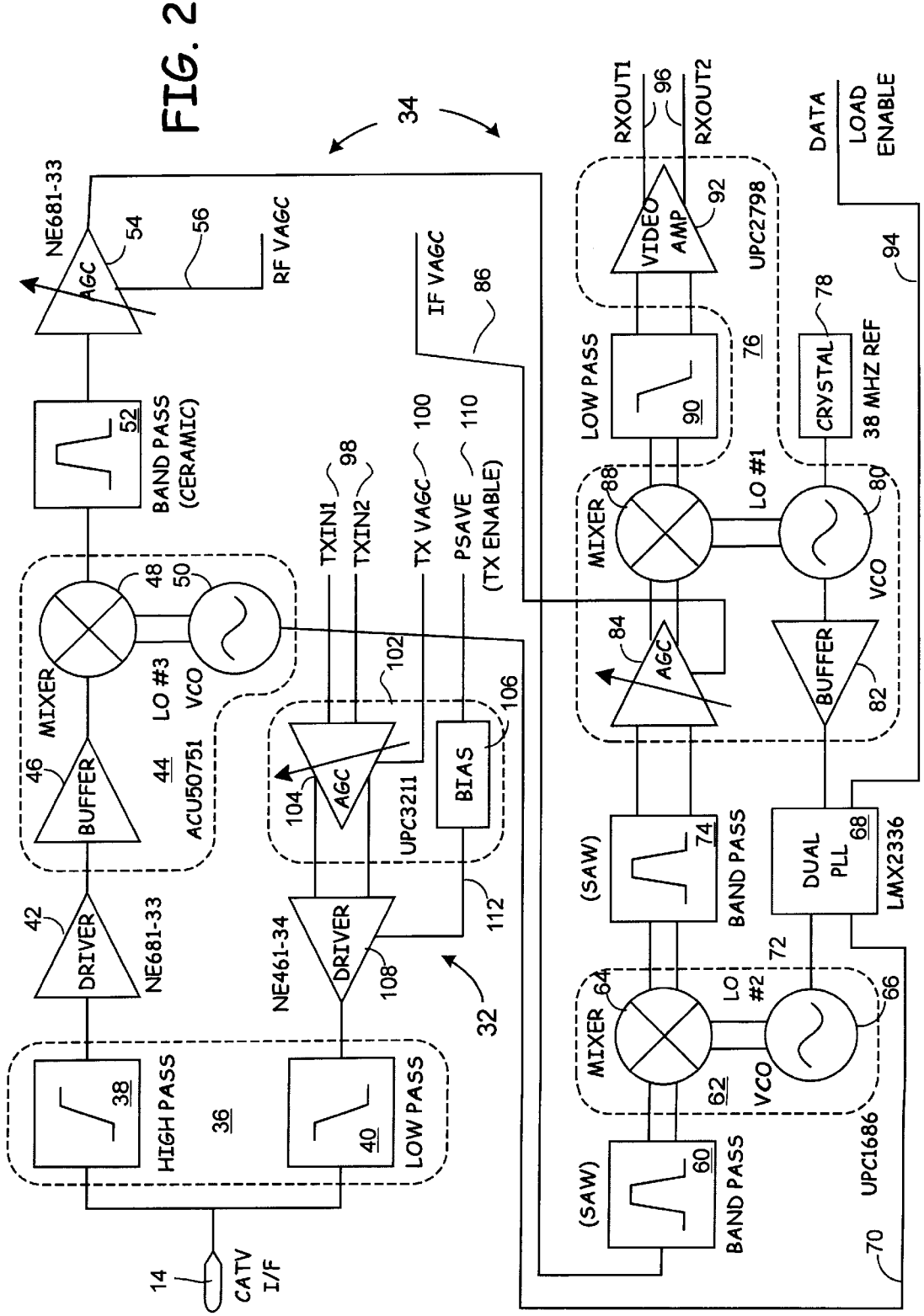
FIG. 2 is a schematic diagram of an RF transceiver well suited for cable modem applications and particularly well suited for compact implementations in accordance with the present invention.

A preferred transceiver circuit embodiment, generally indicated by the reference numeral 30, is shown in FIG. 2. The transceiver 30 includes a transmitter section 32 and a receiver section 34. Both sections 32, 34 of the transceiver are connected in parallel to the CATV connector 14 through a diplexer 36 that implements respective receive and transmit high-pass and low-pass filters 38, 40.

Considering first the receiver section 34 of the transceiver 30, the receive high-pass filter 38 is constructed to allow RF frequencies in the range of about 54 to 860 MHz to be passed through to a discrete component fixed gain driver 42 utilizing a pair of NE681-33 transistors. The RF output signal of the driver 42 is provided to an Anadigics® ACU-0572 CATV cable modem up-converter MMIC 44 and, specifically, to the input of the on-chip buffer 46. This buffer 46 is also a low noise RF amplifier. Depending on the definition of acceptable noise and performance characteristics of the receiver 34, the driver 42 may be omitted to reduce part count, costs, and power requirements. Initial prototypes embodying the invention omit the driver 34.

The RF signal from the buffer 46 is then mixed, through a mixer 48 with an input local oscillator frequency signal identified as $LO_{\#3}$. This $LO_{\#3}$ signal is provided from an on-chip voltage controlled oscillator 50. The frequency of the $LO_{\#3}$ signal is established by a voltage generated off-chip. This voltage is preferably a programmable signal that occurs in a range of voltages appropriate to up-convert the RF signal at the output of the mixer 48 to within a frequency range of 1 to 2 GHz.

The up-converted RF signal is then filtered through an RF band-pass filter 52. This filter 52 is preferably a conventional ceramic RF filter having a pass-band of about 10 MHz centered at about 957 MHz. The up-converted RF signal is then amplified through a discrete component automatic gain control circuit (AGC) 54. As with the driver 42, a pair of NE681-33 transistors form the active components of the AGC amplifier 54. The gain of the AGC amplifier 54 is established by a programmable voltage level provided on the RF VAGC control line 56. The VAGC level is preferably established in correspondence with an output signal provided by the DSP 16.

The amplified RF signal is then provided through a surface acoustic wave (SAW) type band-pass filter 60 having a pass-band that is again about 10MHz centered at about 957 MHz. In the preferred embodiment of the present invention, the filter 60 is a Siemans B4614 SAW device. The filtered RF signal is then provided as the input to a down-converter 62. In a preferred embodiment of the present invention, the down-converter 62 is a wide-band (900 MHz) NEC UPC 1686GV silicon MMIC integrated circuit. The filtered RF signal is provided to the on-chip mixer 64 for mixing with an input local oscillator frequency signal identified as $LO_{\#2}$. This $LO_{\#2}$ signal is provided from an on-chip voltage controlled oscillator (VCO) 66 that is controlled by a voltage generated off-chip. This voltage is preferably a programmable signal that occurs in a range of voltages appropriate to down-convert the RF signal to an IF signal at the output of the mixer 48. Preferably, the down-conversion results in an IF signal with a harmonic component within a frequency range of 43.75 MHz±3 MHz. A second SAW band-pass filter 74 is provided to receive the IF signal and isolate the 43.75 MHz+3 MHz IF signal. In a preferred embodiment of the present invention, the SAW filter 74 is a type X6991T surface mount SAW filter.

Next, the filtered IF signal is provided to an IF down-converter 76. In a preferred embodiment of the present invention, the down-converter is implemented using an NEC UPC2798GR 250 MHz QAM IF Down-Converter. An input AGC amplifier 84, responsive to an IF VAGC signal 86, preferably controlled by the DSP 16, amplifies and provides the IF signal to an on-chip mixer 88 for mixing with an input local oscillator frequency signal identified as $LO_{\#1}$. This $LO_{\#1}$ signal is provided from an on-chip oscillator 80 that utilizes a 38 MHz crystal as part of the external tank circuit. Thus, in the preferred embodiment of the present invention, the $LO_{\#1}$ frequency is a fixed 38 MHz frequency. Consequently, a harmonic output component of the IF signal from the Mixer 88 is in the frequency range of 5.75 MHz+3 MHz. A low-pass filter 90, external to the down-converter 76 isolates this harmonic IF frequency component. The resultant IF signal is then provided to an on-chip video amplifier 92 that, in turn, drives a differential video signal on to the RX OUT1 and RX OUT2 data lines 96. These data lines are preferably connected to input data lines of the DSP 16.

Finally, with regard to the receiver section 34 of the transceiver 30, a buffer circuit 82 is preferably utilized to provide a reference signal from the VCO 80, as derived from the crystal reference 78, to a dual phase lock loop (PLL) circuit 68. This dual PLL 68 is preferably implemented utilizing an National Semiconductor LMX2336T Dual Serial Input PLL. This integrated circuit includes dual programmable prescalers that enable independent PLL operation up to 2.0 GHz and 1.1 GHz, respectively. Data, clock, and load-enable control signals, preferably originated from the control microprocessor 14, are provided on control and data lines 94 to the dual PLL 68 to program, and reprogram as desired, the prescaler values.

In accordance with a preferred embodiment of the present invention, the upper frequency range PLL is used to provide the control voltage to the VCO 50 of the RF up-converter 44 via the control line 70. The lower frequency range PLL is similarly used to provide the control voltage to the VCO 66 of the IF down-converter 62 via control line 72. Thus, the LO frequencies of both the up-converter 44 and down-converter 62 are independently programmable. In accordance with the preferred embodiments of the present invention, there is great flexibility in the choice of IF frequencies due to this programmability. Specifically, the IF frequencies can be, in general, chosen in combinations that are within the bounds of the prescalers and that, in combination, yield a harmonic component at the output of the down-converter 62 that is within the 43.75 MHz±3 MHz range chosen for the preferred embodiments.

Considering now the transmitter section 32 of the transceiver 30, output data lines from the DSP 16 are preferably connected to TX IN1 and TX IN2 98 data lines to provide differential transmit data. The transmitter 32 preferably implements an AGC amplifier 102 to receive the differential transmit data. In a preferred embodiment of the present invention, the AGC amplifier is implemented using an NEC UPC3211 AGC Amplifier. This amplifier provides 50 dB of gain control for signals within a frequency range of 5 to 65 MHz. Signals within this range, or particularly the CATV sub-band range of 5 to 42 MHz can be generated directly or with minimal circuit support by conventional DSP processors.

The differential transmit data is received and amplified by the on-chip AGC amplifier 104. The amplification level of the AGC 104 is set by a TX VAGC signal 100 that is preferably controlled by the DSP 16. A bias circuit 106, also provided on-chip, is similarly controlled by the DSP 16 through the provision of a PSave signal 110, that is effectively used as a transmitter enable signal. When enabled, the bias circuit provides a bias signal to the AGC 104 that enables the amplification function. A bias signal from the bias circuit 102 is also provided on a control line 112 to a driver 108 that is differentially coupled to the output of the AGC amplifier 104. This driver 108 is preferably a discrete buffer circuit constructed utilizing, in a preferred embodiment of the present invention, a pair of NE461-34 transistors as the active elements of the driver 108. The buffered transmit signal is then provided by the driver 108 through the low-pass filter 40 of the diplexer 36 and to the cable plant 14.

As with the AGC amplifier 104, provision of the bias signal enables the functional operation of the driver 108. Conversely, withdrawal of the bias signal preferably operates to shut down and terminate power consumption by the driver 108. This reduces overall power consumption and precludes the generation of any unnecessary and unwanted noise generally and, in particular, injected into the cable plant 14.

The transceiver 30 circuit design enables a number of significant features to be achieved. One such feature is the compact size and unitary physical configuration of the transceiver unit 30 (12). The conventional view is that such close packaging of the transmitter and receiver sections would cause mutual interference. The conventional view is also that using a so-called up/down-converter design would unavoidably create spurious signal non-linearities within the intended wide-band CATV operation of the present invention. Further, the conventional view is that conventional air core inductors would be required in the filter circuits that directly connect to the cable plant 14. The air core inductors would allow manual adjustment of their values, which is the conventional approach to adjusting the transceiver circuit for the operational offsets arising from the specific component combinations realized in each transceiver unit. This, in turn, would be viewed as precluding such a small package size as realized by the present invention.

Figures 3A, 3B:
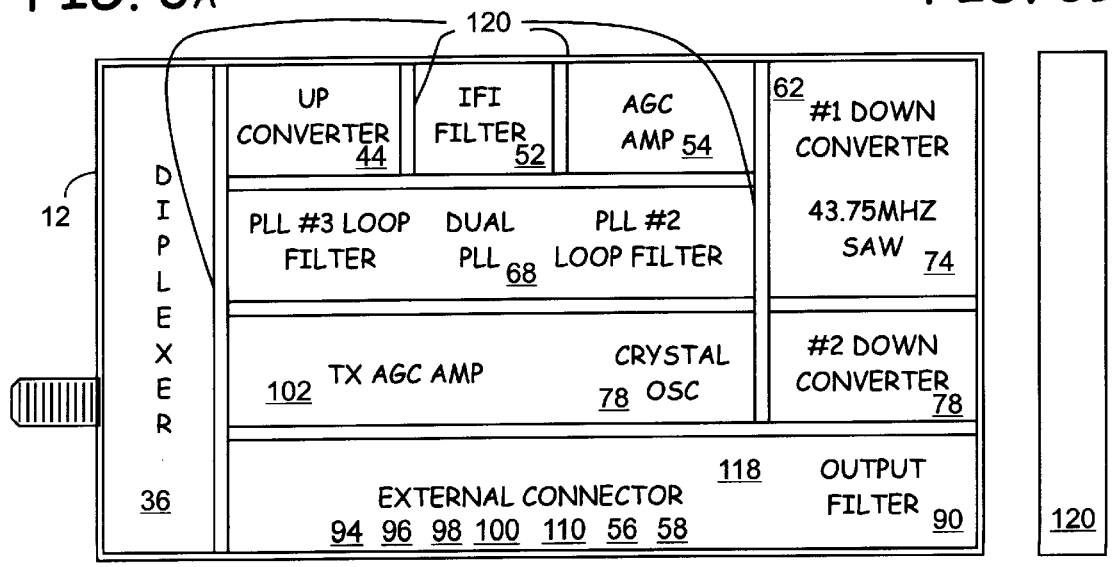
FIG. 3a is a schematic floor plan illustrating the component layout and RF shielding used in a preferred implementation of the present invention.
FIGS. 3b and 3c are side and end views of the preferred embodiment of the housing shield for a preferred embodiment of the compact cable modem transceiver of the present invention.

In accordance with the present invention and as generally illustrated in FIG. 3a at a scale of approximately 1.5:1, the transceiver 12 is realized in a compact, unitary package. Further, additional size reductions are readily expected by up to approximately a factor of 2, and more as higher integration, surface mount devices become available.

One aspect that enables the realization of the compact size without functional compromise of the transceiver 12, is the provision for programmability of the up/down-converter. This allows alternate frequency plans to be implemented through the programmed operation of the control microprocessor to effectively eliminate spurious operation. These spurs are caused by LO crossing products that fall within the desired IF pass-band, which for purposes of the present invention is 43.75 MHz+3 MHz. The general solution for crossing products is:

$$f_{cross} = |m^*LO_{\#3} - n^*LO_{\#2}|$$

where m, n are integers.

For example, the nominal selection of the $LO_{\#2}$ and $LO_{\#3}$ frequencies (obtained using the conventional progression of up/down conversion frequency pairs) for receiver operation at 391.25 MHz would be $LO_{\#3}$=913.25 MHz and $LO_{\#2=957}$ MHz. The crossing product for $2LO_{\#3}-3LO_{\#2}$ falls at 43.25 MHz, which is within the desired pass-band. In accordance with a preferred embodiment of the present invention, slight alterations in the $LO_{\#3}$ and $LO_{\#2}$ frequencies by obtained reprogramming the PLL prescalers, implements an alternate frequency plan for 391.25 MHz. By setting $LO_{\#3}$=907.25 MHz and $LO_{\#2}$=951 MHz, the crossing product for $2LO_{\#3}-3LO_{\#2}$ now falls at 37.25 MHz, which is outside of the desired pass-band.

The alternate frequency plan values for $LO_{\#3}$ and $LO_{\#2}$ where alternate frequency pairs are need to avoid a cross over spur in the pass-band are preferably chosen as values close to the normally chosen values that are discretely settable by reprogramming of the PLL prescalers and whose cross-over products, preferably out to nine product terms, fall outside of the pass-band. The base frequency plan can be easily calculated as needed by the control microprocessor 18. The alternate frequency plan may be calculated, though preferably, the occurrences are sufficiently few to be stored literally as exceptions in the calculation of the frequency plan by the control microprocessor 18.

Added benefits to being able to implement the alternate frequency plans, in accordance with the present invention, include minimizing the mutual interference between the two high-frequency LOs 44, 62 provided in the transceiver circuit. This, in turn, precludes the necessity to provide significant additional shielding or greater physical space, or both, between the LOs 44, 62. In addition, the ability to down-convert the IF signal to lower frequencies without interference from the up-converter allows the user of lower frequency, lower cost components, including for example the filters and in the PLL circuits.

Another aspect that enables the realization of the compact size without functional compromise of the transceiver 12, is the use of a single crystal reference 78. Use of the single, relatively low frequency and low-cost crystal 78 not only directly minimizes the physical size of the transceiver circuit 30, but also removes the need for additional offset compensation circuits. As implemented consistent with the present invention, the use of the single crystal 78 directly supports the use of sealed, fixed value, small, surface mount inductors in the diplexer 36 and thus indirectly a physically smaller diplexer 36. Furthermore, no post assembly tuning is required.

The use of the single crystal reference 78 is enabled by providing the dual PLL 68 that, in turn, drives the $LO_{\#2}$ and $LO_{\#3}$ oscillators. Thus, in accordance with the preferred embodiments of the present invention, the offset characteristics of all three oscillators implemented in the transceiver 12 are related and, in particular, the $LO_{\#2}$ and $LO_{\#3}$ frequencies are phase-coherent. The offset effect on the $LO_{\#2}$ and $LO_{\#3}$ oscillators is large due to the large frequency factors used. However, the relative polarity of the offset effect are complementary due to the complementary conversion polarities. Because the $LO_{\#2}$ and $LO_{\#3}$ remain phase-coherent independent of the offset value, the effect of any offset is substantially canceled. Thus, in accordance with the present invention, the establishment of the frequency plan is preferably designed to generally minimize the difference between the $LO_{\#2}$ and $LO_3$ frequencies and thereby maximally, at least to within an offset tolerance range as may be defined in design for the transceiver 30, cancel the effect of offset on the transceiver circuit 30 as a whole.

Finally, an aspect of the transceiver circuit 30 that further enables the realization of the compact size without functional compromise of the transceiver 12, is the selective use of differential signal transmission paths in the lower frequency portions of the transceiver circuit 30. Specifically in accordance with the preferred embodiments of the present invention, the AGC 102 and driver 108 of the transmitter section 32 and the down-converters 62, 76 of the receiver section 34 utilize differential signal transfer paths. These parts of the circuit 30 are selected because of the overlapping ranges of frequencies involved: the designated portion of the transmitter section 32 is operable between about 5 and 42 MHz while the corresponding portion of the receiver section is operating between about 5 and 47 MHz. Thus, any common-mode interference between these portions of the transceiver circuit 30 are minimized through the use of differential signal lines. Again, this allows the circuits to be placed in quite close proximity to one another and with minimal RF shielding requirements needed to maintain the requisite operational performance of the transceiver circuit 30.

Figure 3C:
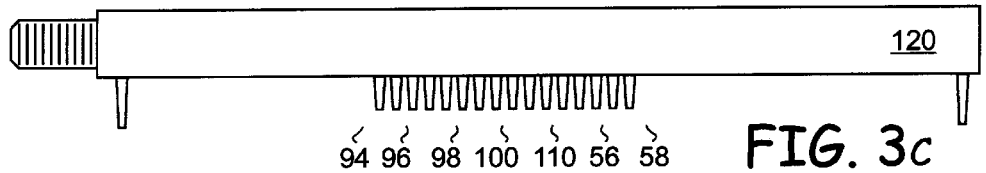

Referring to FIG. 3a again, the preferred layout or floor plan for the transceiver circuit 30 is shown. The crystal reference 78 and filter 60 are provided on the back side of the printed circuit board 118. The remaining circuitry is, in a preferred embodiment of the present invention, provided on the front side of the printed circuit board 118. The sections of the transceiver 12 are separated, substantially as shown, by single thickness RF shields 120. Spacing of the different portioned sections of the circuit 30 does not appear to be particularly critical in view of the design features of the transceiver circuit 30, as provided in accordance with the present invention. As generally illustrated in FIGS. 3b and 3c, the low-profile and compact dimensions of the compact cable modem transceiver are clear. The close placement of the transceiver components with minimal and relatively conventional shielding between compartments of the floor plan result in an easily constructed device that is readily commonditizable. Furthermore, the design of the cable modem transceiver, by enabling the utilization of fixed valued components and otherwise avoiding the requirements of tuning or re-tuning of circuit parameters, further enables a simple and compact housing implementation.

Figure 4:
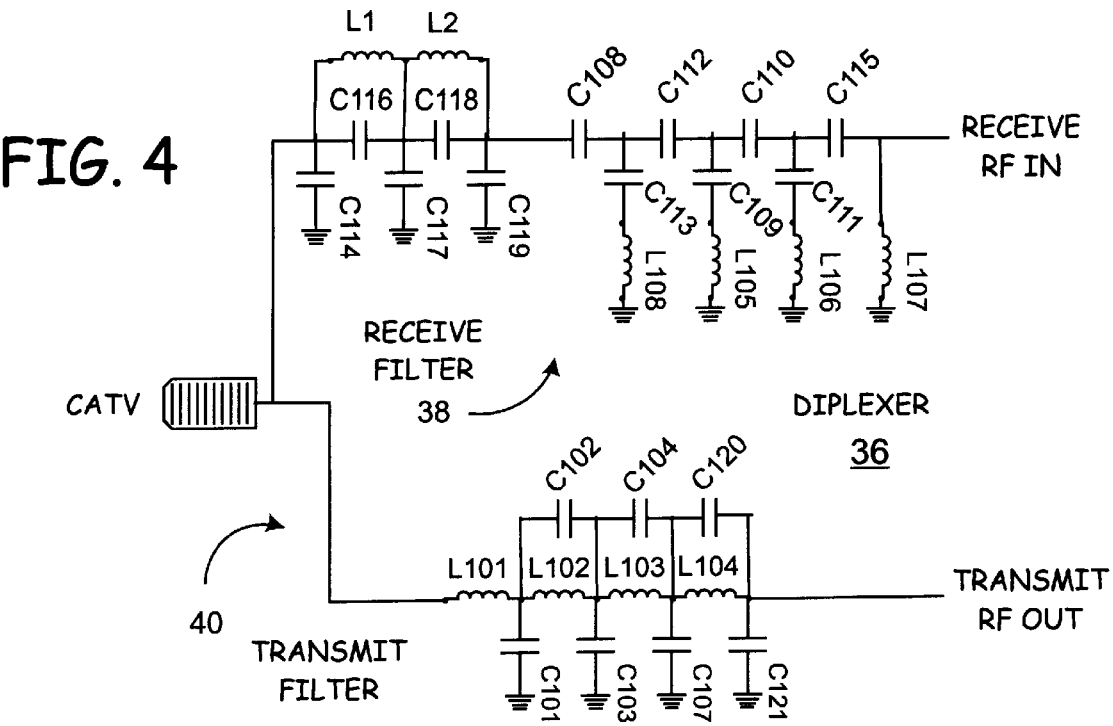
FIG. 4 provides a circuit schematic of the fixed value diplexer circuit utilized in a preferred low-cost, high-reliability implementation of the present invention.

The preferred embodiment of the diplexer 36, demonstrating the use of small, fixed value, and surface mountable parts is detailed in FIG. 4. As shown the filters 38, 40 are constructed from fixed value components that are easily placed during assembly using conventional assembly automation systems. The preferred values are provided in the following table.

TABLE 1

| Receive Filter 38 | | | | Transmit Filter 40 | | | |
| --- | --- | --- | --- | --- | --- | --- | --- |
| Inductor | | Capacitor | | Inductor | | Capacitor | |
| L1 | Trace | C114 | NL | L101 | 330 nH | C101 | 82 pF |
| L2 | Trace | C116 | 2.2 pF | L102 | 220 nH | C103 | 62 pF |
| L108 | 220 nH | C117 | 1.0 pF | L103 | 220 nH | C107 | 62 pF |
| L105 | 220 nH | C118 | 2.7 pF | L104 | 220 nH | C121 | 51 pF |
| L106 | 220 nH | C119 | 3.3 pF | | | C102 | 36 pF |
| L107 | 220 nH | C108 | 39 pF | | | C104 | 22 pF |
| | | C112 | 30 pF | | | C120 | 4.7 pF |
| | | C110 | 47 pF | | | | |
| | | C115 | 22 pF | | | | |
| | | C113 | 62 pF | | | | |
| | | C109 | 75 pF | | | | |
| | | C111 | 150 pF | | | | |

Figure 5:
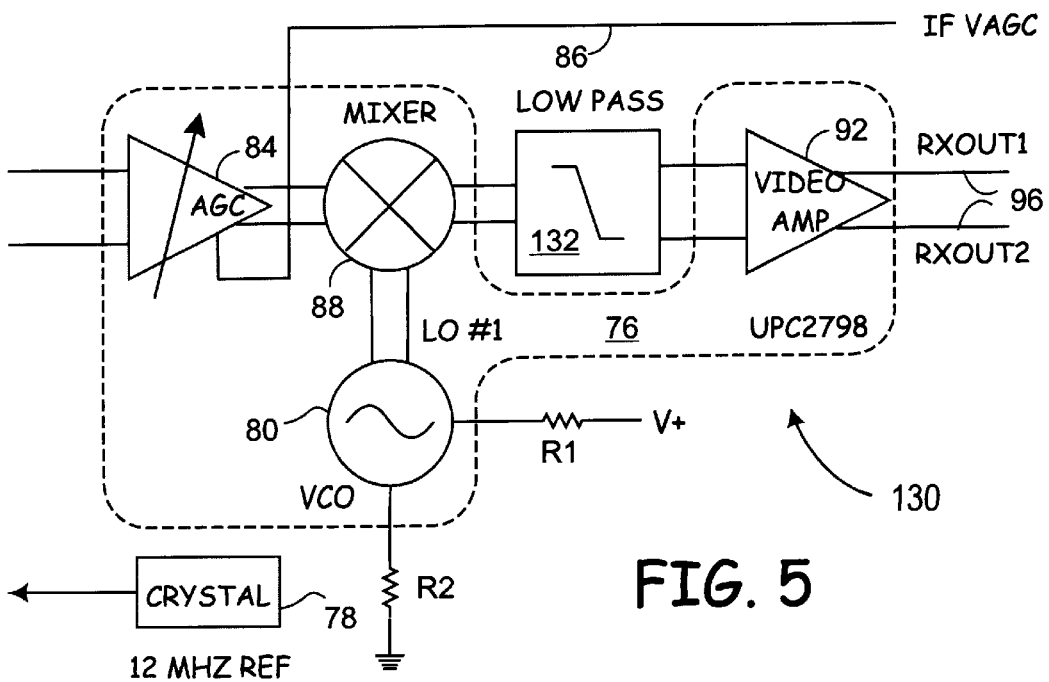
FIG. 5 provides a schematic diagram of an alternate down-conversion output stage of the receiver section of a preferred embodiment of the compact cable modem transceiver of the present invention.

FIG. 5 presents an alternate embodiment implementation of the final stage of the receiver section 34. Whereas the implementation described above provided for the frequency down-conversion of the data signals provided from the band-pass filter 74, the final stage 130 provides no frequency conversion. Rather, the final stage 130 is designed to provide an amplification and buffering function that enables the DSP 16 to directly sample the data signals as filtered through the band-pass filter 74. Consequently, the DSP 16 may programmatically implement the final frequency down-conversion of the data signals by any of a number of different algorithms as may be deemed suitable in the operation of the DSP 16. This digital down-conversion will inherently be insensitive to any harmonics produced in the operation of the mixers 48, 64, resulting in a higher signal-to-noise ratio and better overall performance by the transceiver 12.

The preferred direct-sampling configuration of the output stage 130, as shown in FIG. 5, again utilizes a UPC2798 QAM IF Down-Converter 76. The input differential AGC amplifier 84 operates as before in response to the IF VAGC 86 control signal. The mixer 88 is effectively disabled to a signal pass-through state by application of a DC bias voltage to the VCO 80 instead of the 38 MHz frequency source signal of the above-described embodiment. The DC bias voltage is provided by current limiting resistors, R1, R2, of about 15 Kohms each. Additional low-value capacitors (not shown) provided in parallel with the resistors may be used to minimize any noise injection into the VCO 80. The frequency source 78, preferably operating at 12 MHz, is used to provide a base operating frequency to the Dual PLL 68.

The differential data signals from the AGC 84 are then passed through a low-pass filter 132, having a cross-over frequency selected to substantially block noise coupling from the intermodulation of the mixers 48, 64. The differential data signals are then provided to the video amplifier 92 as a final buffer and data driver of the output data signal on to the RX OUT1 and RX OUT2 data lines 96. As before, these data lines are preferably connected to input data lines of the DSP 16.

The choice of output stages 130 to use depends on a number of factors. The frequency down-conversion configuration of the stage 130, as first described above, reduces the processing requirements of the DSP 16, either allowing for a lower-performing and lower cost DSP 16 to be used or allowing additional DSP functions to be implemented. The direct-sampling configuration of the stage 130 requires a higher-performance and higher-cost DSP 16, as necessary to digitally perform the final down-conversion, but will achieve better overall performance and will allow for programmable adaptation of the down-conversion process. The direct-sampling configuration also provides a greater opportunity for remote analysis and improvement of the signal processing functions of the cable modem transceiver 10 as a whole.

Figure 6:
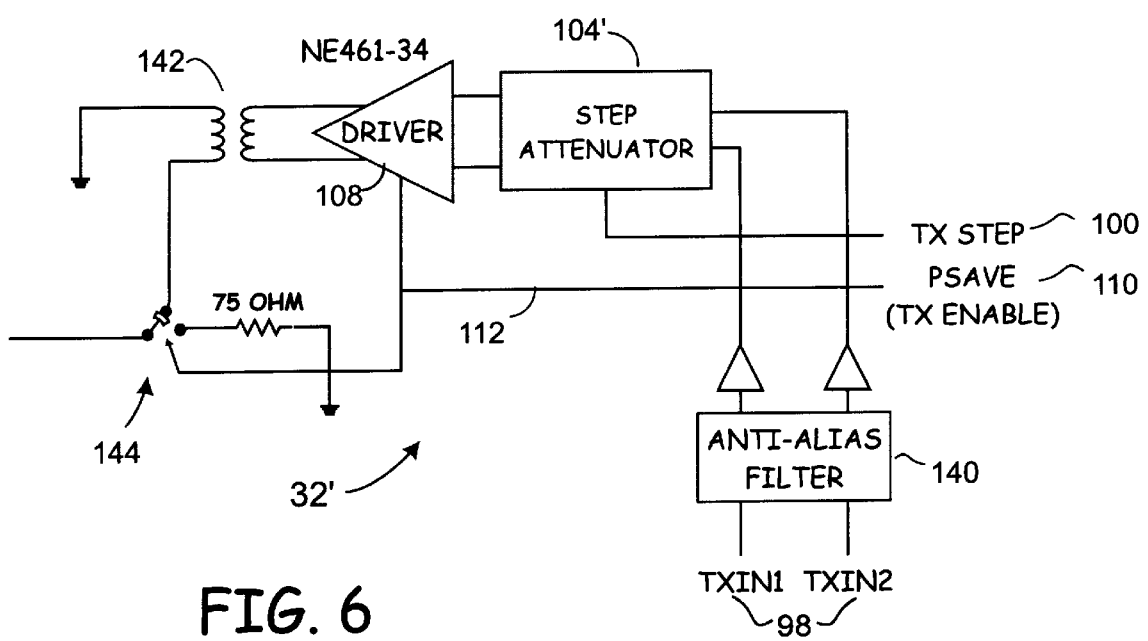
FIG. 6 provides a schematic diagram of an alternate transmitter section of a preferred embodiment of the compact cable modem transceiver of the present invention.

Finally, a transmitter circuit 32', as shown in FIG. 6, presents an alternate and presently preferred embodiment of the previously described transmitter and associated control circuit 32. As before, the transmit data signals are provided via TXIN1 and TXIN2 lines 98. The differential transmit data signals are provided through a conventional anti-alias filter and buffered by a pair of zero dB single-ended buffer/amplifiers. The resulting signals are then selectively attenuated by a step-attenuator circuit 104'. This attenuator circuit 104' selects, in a preferred embodiment thereof, one of three attenuation levels based on the state of a TX step signal 100 provided from the control microprocessor 18. Thus, this embodiment 32 employs a discrete attenuation control, rather than the continuous, AGC based control as provided by the transmitter circuit 32 shown in FIG. 2.

The differential transmit output signals from the step-attenuator 104' are provided through the differential driver 108 and applied across one winding of a conventional RF isolation transformer 142. As before, the driver 108 is selectively enabled by a PSAVE control signal 110 supplied by the microprocessor 18 on the control line 112. This control signal is also, in this preferred embodiment, supplied to an electronic switch 144 that selectively couples one end of the second winding of the RF isolation transformer 142 to the Transmit RF Out lead of the diplexer circuit 40 when transmission of an RF signal is enabled. When the state of the PSAVE control signal 110 is set to disable transmission, the switch 144 connects the Transmit RF Out lead of the diplexer circuit 40 through a resistive load to an RF signal ground, thus establishing a fixed termination characteristic for the transmitter portion of the diplexer circuit 40 during periods of RF reception.

Thus, a compact transceiver design suitable for use in commodity cable modems has been described. While the present invention has been described particularly with reference to domestic CATV RF frequencies and cable modem applications, the present invention is equally applicable foreign standard CATV, such as European CATV that operates at 36.125 MHz±4 MHz, and to RF transceiver systems operating with directional and nondirectional antenna radiators at low-power unregulated RF frequencies, and in other applications at RF frequencies other than those associated with CATV.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A CATV transceiver comprising:
   a) a housing providing RF shielding for a transceiver circuit, said housing enclosing a circuit including:
      i) a diplexer, including fixed value inductors, coupleable to a CATV cable plant to receive an RF input signal and to transmit an RF output signal;
      ii) an RF receiver coupled to said diplexer and including a frequency up-converter, a first frequency down-converter and a second frequency down-converter, said converters each including a voltage controlled oscillator coupled to a signal mixer, each said voltage controlled oscillator being responsive to a control signal generated from a single oscillator crystal, said second frequency down-converter operating to provide an output signal representative of said RF input signal within a predetermined output frequency pass-band; and
      iii) an RF transmitter coupled to said diplexer, said RF transmitter providing for the transmission of said RF output signal in response to an input signal; and
   b) control means coupled through said housing to said frequency up-converter and said first frequency down-converter to establish the respective modulation frequencies of said frequency up-converter and said first frequency down-converter, said control means selecting said respective modulation frequencies such that the LO-related frequency cross-products due to the concurrent use of said respective modulation frequencies occur outside of said predetermined frequency pass-band.

2. The CATV transceiver of claim 1 wherein said second modulation frequency down converter provides for the output of an alternative output signal suitable for direct digital conversion through direct sampling of said output signal.

3. The CATV transceiver of claim 1 or 2 wherein said housing forms a compact, integral component that encloses said RF transmitter, said RF receiver, and said diplexer provided on a single printed circuit board.

4. The CATV transceiver of claim 3 wherein said diplexer consists of a network of fixed value capacitors and inductors, whereby said CATV transceiver nominally operates without requiring trimming or tuning of any of said diplexer, said RF transmitter, and said RF receiver.

5. A compact CATV transceiver comprising:
   a) a unitary radio-frequency shield housing;
   b) a radio-frequency receiver including a down-converter provided within said unitary radio-frequency shield housing, said down-converter including phase coherent first and second local-oscillators, wherein the operating frequencies of said first and second local-oscillators are defined respectively by first and second control signals; and
   c) a radio-frequency transmitter including an up-converter provided within said unitary radio frequency shield housing; and
   d) a programmable frequency controller, including a reference frequency source, provided within said unitary radio-frequency shield housing, said frequency controller providing said first and second control signals at predetermined paired levels in response to corresponding predetermined programming values that are interdependently selected to reduce intermodulation error.

6. A compact CATV transceiver comprising:
   a) a unitary radio-frequency shield housing;
   b) a radio-frequency receiver including a down-converter provided within said unitary radio-frequency shield housing, said down-converter including first and second local-oscillators controlled respectively by first and second control signals; and
   c) a radio-frequency transmitter including an up-converter provided within said unitary radio frequency shield housing; and
   d) a programmable frequency controller, including a reference frequency source, provided within said unitary radio-frequency shield housing, said frequency controller providing said first and second control signals at predetermined paired levels in response to corresponding predetermined programming values, wherein said predetermined paired levels establish the operation of said down-converter such that the LO-related frequency cross-products produced by the combined operation of said first and second local-oscillators falls outside of a predetermined frequency range.

7. The compact CATV transceiver of claim 6 wherein a transmit signal occurring within said predetermined frequency range is provided to said radio-frequency transmitter whereby undesirable coupling between said down-converter and said radio-frequency transmitter is avoided.

8. The compact CATV transceiver of claim 7 further comprising a control microprocessor coupled to said programmable frequency controller to provide said predetermined programming values.

9. The compact CATV transceiver of claim 8 wherein said radio-frequency receiver includes an output stage within said unitary radio-frequency shield housing, said output stage being configurable to provide direct signal sampling of a predetermined received data signal as processed serially through said down-converter.

10. The compact CATV transceiver of claim 8 wherein said radio-frequency receiver includes an output stage within said unitary radio-frequency shield housing, said output stage including a frequency down-conversion unit that provides a predetermined frequency output signal corresponding to a predetermined received data signal as processed serially through said down-converter, said predetermined frequency output signal being within said predetermined frequency range, whereby coupling of noise from said down-converter into said output stage is avoided.

11. An compact radio-frequency transceiver comprising:
   a) a compact radio-frequency-shielded enclosure including a first signal connector externally coupleable to receive a first predetermined low-frequency data signal, a second signal connector externally coupleable to provide a predetermined radio-frequency signal, and a third signal connector externally coupleable to provide a second predetermined low-frequency signal, said first and second low-frequency data signals occurring within a predetermined frequency pass-band;
   b) an radio-frequency transmitter provided within said compact radio-frequency shielded enclosure and coupled between said first and second signal connectors, said radio-frequency transmitter including an up-converter that provides said predetermined radio-frequency signal in correspondence to said first predetermined low-frequency signal; and
   c) a radio-frequency receiver provided within said compact radio-frequency shielded enclosure and coupled between said second and third signal connectors, said radio-frequency receiver including a down-converter that provides said second predetermined low-frequency signal in correspondence to said predetermined radio-frequency signal, said radio-frequency transmitter and receiver being inter-coupled so that the respective modulation frequencies of said up and down-converters are such that the LO-related frequency cross-products due to the concurrent use of said respective modulation frequencies occur outside of said predetermined frequency pass-band.

12. The compact radio-frequency transceiver of claim 11 wherein the respective IF frequencies of said up and down-converters are programmable and wherein said compact radio-frequency transceiver further comprises a microcontroller coupled to said up and down-converters to select and program predetermined pairings of the respective IF frequencies.

13. The compact radio-frequency transceiver of claim 11 or 12 wherein said down-converter includes first and second frequency controlled down-conversion units, which include respective first and second local-oscillators, wherein said compact radio-frequency transceiver further comprises a base frequency source, and wherein said first and second local-oscillators operate in common from said base frequency source.

14. The compact radio-frequency transceiver of claim 13 wherein said base frequency source includes first and second phase locked loops operating in common from a base frequency crystal and providing respective first and second control frequencies to said first and second local-oscillators.

15. The compact radio-frequency transceiver of claim 14 wherein the frequency conversion products of said first and second local-oscillators are complementary and wherein the frequency conversion offsets of said first and second local-oscillators are mutually offsetting.

16. The compact radio-frequency transceiver of claim 15 wherein said radio-frequency transmitter and receiver are coupled to said second connector through a diplexer and wherein said diplexer includes a network of fixed value inductors and capacitors.

17. The compact radio-frequency transceiver of claim 16 wherein said down-converter further includes a down-conversion output stage that is coupled in series with said first and second down-conversion units between said diplexer and said third signal connector and wherein said down-conversion output stage provides a direct sampling signal as an alternative to said second predetermined low-frequency signal.

18. The compact radio-frequency transceiver of claim 16 wherein said down-converter further includes a down-conversion output stage that is coupled in series with said first and second down-conversion units between said diplexer and said third signal connector and wherein said down-conversion output stage includes a third down-conversion unit that operates to provide said second predetermined low-frequency signal.

19. The compact CATV transceiver of claim 5 wherein said first and second local-oscillators operate from a common reference frequency such that the operation of said first and second local-oscillators is phase-coherent.

20. The compact CATV transceiver of claim 19 wherein the interdependent selection of said predetermined paired levels operates to selectively shift the cross-over frequency of said first and second local-oscillators to a frequency outside of a pass-band corresponding to the selection of said predetermined paired levels.

* * * * *